United States Patent [19]

Cusano et al.

[11] Patent Number: 5,024,791
[45] Date of Patent: Jun. 18, 1991

[54] METHOD OF PRODUCING A PHOTOSTIMULABLE X-RAY IMAGE CONVERTOR

[75] Inventors: Dominic A. Cusano; Gary W. Yeager, both of Schenectady, N.Y.

[73] Assignee: General Electric Company, Schenectady, N.Y.

[21] Appl. No.: 300,132

[22] Filed: Jan. 23, 1989

Related U.S. Application Data

[60] Division of Ser. No. 111,359, Oct. 22, 1987, abandoned, which is a continuation-in-part of Ser. No. 46,442, May 6, 1987, abandoned.

[51] Int. Cl.$^5$ .............. C09K 11/02; B29C 67/02
[52] U.S. Cl. ................................. 264/21; 264/122
[58] Field of Search ............ 264/21, 122, 126, 1.1, 264/1.7; 252/301.16, 301.36, 301.4 H

[56] References Cited

U.S. PATENT DOCUMENTS

| | | | |
|---|---|---|---|
| 3,366,573 | 1/1968 | Feuer | 252/301.36 X |
| 3,471,699 | 10/1969 | McCall | 252/301.36 X |
| 4,316,817 | 2/1982 | Cusano et al. | 252/301.36 X |
| 4,362,946 | 12/1982 | Cusano et al. | 264/21 X |
| 4,374,749 | 2/1983 | Cusano et al. | 252/301.36 X |

Primary Examiner—Jan H. Silbaugh
Assistant Examiner—Christopher A. Fiorilla
Attorney, Agent, or Firm—John F. McDevitt

[57] ABSTRACT

A method of producing a photostimulable x-ray converter for digital radiographic applications including forming a solid mixture of europium activated barium fluorohalide phosphor and a chemical compound containing an impurity ion, heating the mixture to cause the impurity ion to diffuse into the phosphor matrix, combining the treated phosphor crystals with a thermoplastic synthetic organic polymer, subjecting the second mixture to elevated pressure and temperature conditions to obtain a void free suspension and cooling the mixture to obtain a solid storage member.

8 Claims, 1 Drawing Sheet

METHOD OF PRODUCING A PHOTOSTIMULABLE X-RAY IMAGE CONVERTOR

This application is a division of application Ser. No. 07/111,359, filed Oct. 22, 1987 and now abandoned, which is a continuation-in-part of application Ser. No. 07/046,442, filed May 6, 1987 and also now abandoned.

RELATED PATENT APPLICATION

A co-pending application Ser. No. 07/111,358 filed concurrently with the parent application of the present application and assigned to the same assignee as the present application, now abandoned, discloses a related x-ray image converter medium and improved digital radiographic imaging system employing said medium. Since the present invention represents an improvement thereof, said referenced co-pending application is specifically incorporated herein by reference.

BACKGROUND OF THE INVENTION

Various type x-ray image converters utilizing photostimulable luminescent materials have long been known such as radiographic intensifier screens fluoroscopic screens, and x-ray image intensifier tubes. For example, in U.S. Pat. No. 3,617,743, assigned to the assignee of the present invention, there is disclosed lanthanum and gadolinium oxyhalide luminescent materials activated with terbium which exhibit superior conversion efficiency when employed to convert x-rays impinging on said phosphor medium to visible light. X-rays from a suitable x-ray source which pass through an object and impinge upon said phosphor medium form an immediate first light image which can be recorded on photographic film as well as produce a radiographic latent image which remains in said phosphor medium unless thereafter recalled by a suitable energy source to produce a second light image by thermoluminescent response. To further illustrate the nature of said latter phosphor behavior, there is disclosed in U.S. Pat. No. 3,996,472, also assigned to the present assignee, various rare earth oxyhalides co-activated with terbium and a second activator selected from zirconium and hafnium exhibiting superior thermoluminescent behavior in radiation dosimeters when subjected to heat stimulation. In more recently issued U.S. Pat. Nos. 4,346,295 and 4,356,398 there is disclosed laser means emitting light as a source of stimulating energy which produces the same type thermoluminescent response in various phosphor materials. A helium-neon laser in therein disclosed as the energy stimulation source for said purpose. Such a method of exciting the phosphor materials has been termed "photostimulation" wherein the energy from optical photons (ultraviolet, visible or infrared radiation) is said to stimulate the emptying of stored energy to produce light emission of the type termed "photostimulated luminescence" as distinct from "thermostimulated luminescence" which is produced by heating. Accordingly, the energy source of electromagnetic radiation hereinafter mentioned in describing the present invention as means for producing said photostimulated luminescent response in the phosphor medium herein being employed means ultraviolet, visible or infrared radiation.

X-ray image converters employing a conventional photostimulable phosphor medium still experience major problems with the optical image formed when retrieving the latent radiographic image from the phosphor medium. Said conventional phosphor medium is generally in the form of a porous layer of the phosphor particles bonded to a supporting substrate and with the void spaces between the individual phosphor particles causing some failure to retrieve all of the stored information as well as some loss of the emerging optical radiation. A partial solution to this problem is disclosed in U.S. Pat. No. 4,375,423, also assigned to the present assignee, wherein the phosphor particles are embedded or suspended in an optically transparent matrix which is selected or adjusted to have an index of refraction which is approximately equal to that of the phosphor embedded therein at the wavelength of light being emitted by the phosphor. This improvement enables more of the visible radiation being generated when the phosphor converts the impinging x-rays and forms an immediate first light image to escape from said medium. Spatial resolution for said immediate first light image is primarily determined by whatever spreading or scattering of the emitted light takes place in the phosphor medium. In accordance, with said improvement, phosphor particles of europium activated fluorochloride are embedded in a matrix of synthetic organic polymer such as the polymerization product of 2-vinyl naphthalene and vinyl toluene to provide superior optical coupling to photoelectrically responsive devices. There is further disclosed in said improvement various methods to manufacture such indexmatched phosphor medium for use in x-ray image converter devices suitable for various digital radiographic imaging equipment.

As distinct from said above described radiographic imaging systems wherein the entire visual image is displayed at one time, the present digital radiographic imaging system employs a moving beam of electromagnetic radiation to retrieve the latent radiographic image stored in said phosphor medium. Minimal spreading of said photostimulation energy as the moving energy beam penetrates the phosphor medium is most important to permit the latent image to be readout or recalled with higher resolution for a given thickness of said medium. Accordingly, resolution loss for the recalled visual image is experienced if the photostimulation energy becomes scattered within the phosphor medium beyond the specific lateral area being read at a particular time interval. Accurate retrieval of the stored information in the present system understandably further requires that all phosphor particles be accessed within the specific area being read at said time interval. This does not occur in the prior art x-ray screens due to excessive lateral light scattering which permits only shallow penetration of the phosphor medium by the photostimulation energy. Improved recovery of the latent radiographic image in the present manner thereby dictates minimal scattering of the photostimulation energy as distinct from that light or emission subsequently generated by the phosphor. Scattering of the visible or ultraviolet radiation produced when said photostimulation energy is selectively absorbed by the information containing phosphor particles is of lesser importance in the present type digital radiographic imaging system. The conventional photodetection means now employed in said type system are designed to collect all emerging radiation despite being scattered within the phosphor medium.

There also remains a need for larger size x-ray image converter constructions of this type. For example, digital radiographic systems are needed to scan relatively large areas of a patient such as employed for a chest diagnosis and which can exceed an area of one-half square foot or greater. To meet such large area requirement the index-matching matrix in which the phosphor particles are distributed must provide a self-supporting composite medium. To do so not only requires that the matrix constituent of said composite medium exhibit sufficent mechanical strength but also that the selected phosphor material be capable of forming a stable and uniform dispersion in said matrix constituent. It becomes especially important in the latter regard that a substantially void-free suspension of said phosphor particles result in order to preserve the desired optical improvement.

For still other reasons, it is required that a relatively large proportion of the index matched medium be occupied by the phosphor constituent. Absorption for most of the impinging radiation is desirable in the composite x-ray converter medium so that an accurate radiographic image therein is stored which dictates that sufficient phosphor be employed to achieve the desired degree of absorption. Accordingly, the phosphor and matrix constituents in the composite medium should be sufficiently compatible so that phosphor loadings can be achieved wherein the phosphor particles occupy a minimum weight fraction in said medium of at least 20-25%. Increasing the relative weight proportion of phosphor in the composite medium can also reduce absorption by the matrix constituent of the photostimulation energy being employed to recall the latent radiographic image previously stored in said composite medium. Since it is further desirable in said retrieval steps to access all the embedded phosphor particles which may contain the x-ray stored information, any undue absorption of the electromagnetic energy producing such retrieval by the matrix constituent can effectively prevent an accurate retrieval.

SUMMARY OF THE INVENTION

A novel photostimulable x-ray converter medium has now been discovered to form a more accurate optical image upon retrieving a latent radiographic image stored within such medium. Specifically, said photostimulable x-ray image converter medium for digital radiography comprises a composite of modified phosphor particles suspended in a matrix of a solid synthetic organic polymer having an optical refractive index closely matching the optical refractive index of said phosphor said modified phosphor comprising crystals of barium fluorohalide activated with europium ion which further contain a level of an impurity ion selected from Group 1A and 3A elements in the periodic table of elements to reduce the optical refractive index of said phosphor. To achieve the aforementioned objective, however, the optical refractive index match in the present composite phosphor medium is further required to take place at the wavelength of the energy source being employed to recall said latent radiographic image. Said composite medium can be employed as a layer configuration in a digital radiographic imaging system which further includes an x-ray source to expose the x-ray image converter medium to x-rays passing through an object in order to record a latent radiographic image in said medium, an energy source to recall said radiographic latent image as an optical image thereof, photodetection means optically coupled with said x-ray image converter medium to read the optical image, and means for digital recording of said optical image. In the preferred embodiments, the phosphor portion in said x-ray image converter medium occupies a minimum weight fraction in said medium of at least 50% while the source of electromagnetic radiation stimulating the phosphor is a laser beam. To still further illustrate the presently improved index-matching characteristics for a representative composite converter medium in said type improved digital radiographic imaging equipment, a typical unmodified barium fluorochloride phosphor ordinarily exhibiting an optical refractive index of approximately 1.654 at a wavelength of 633 nanometers can now be modified to substantially match the 1.633 optical refractive index exhibited by a suitable polysulfone homopolymer at said wavelength. Operation of said improved digital radiographic imaging system can employ a helium-neon laser emitting at a wavelength in the range of approximately 630-633 nanometers to provide the recall excitation energy and with ultraviolet photodetector devices being employed to collect the phosphor emission caused by said excitation.

The employment of a composite phosphor medium exhibiting an optical refractive index matched at the wavelength of the recalling energy source for deeper penetration provides important further related advantages. It becomes thereby possible to employ a phosphor medium having a greater thickness for better stoppage of the X radiation which forms the latent radiographic image in said medium. As a result, thicker x-ray image converters can now be utilized to absorb 60-70% of the impinging X radiation for a more accurate image formation as distinct from the conventional members which are made thinner to better enable retrieval of the stored latent image. The higher degree of resolution achieved for a given screen thickness in accordance with the present invention than is obtained in prior art x-ray screens understandably provides the same resolution using said much thicker screens. A greater x-ray absorption provided in said manner is understandably further beneficial in reducing patient exposure to x-ray dosage.

Preferred phosphor compositions according to the present invention employ a level of europium activator ion in a preferred barium fluorochloride phosphor in the approximate range 0.1-2.0 weight percent. Other suitable phosphors of this type are known, however, to include partial substitution for the barium ion in the phosphor matrix with other metal ions as well as like substitution of other halide ions for the chloride ion. In the latter regard, partial or complete substitution of bromide ion for the choride ion in said phosphor is further deemed possible. Correspondingly the europium activator level can be varied both below and above the preferred range given above and co-activation of the phosphor is also contemplated with still further modification of the europium activator level especially with regard to exercising a desirable control of the phosphor emission characteristics such as afterglow.

Modification of the europium activated barium fluorohalide phosphor constituent in the presently improved x-ray converter medium to more closely match the optical refractive index of the selected polymer matrix constituent can be achieved in a simple and direct manner. For example, a typical barium fluorochloride phosphor containing europium activator levels in the approximate range 0.1-2.0 weight percent based on the weight of said phosphor can be doped with halide compounds of the aforementioned index reducing elements including sodium, potassium, rubidium, cesium, aluminum, gallium, boron, and indium to produce the desired modifications at a 0.3-3.0 weight percent level of these impurity elements. To still further illustrate a suitable method for said phosphor modification, the phosphor crystals are first contacted with a liquid solution of said impurity ion compound and the solvent thereafter removed therefrom to form a solid mixture, with said solid physical mixture being subsequently heated to cause the impurity ion to selectively diffuse into the phosphor matrix and form a solid solution therein. The heating of said solid mixture is preferably first carried out under non-oxidizing atmospheric conditions and followed by reheating under oxidizing conditions. In the foregoing manner, said representative phosphor composition can be doped with an aqueous sodium bromide solution and after the solvent evaporation, the dried phosphor heated in hydrogen gas at approximately 800° C. for several hours to incorporate the sodium ion in said phosphor matrix. Refiring of said phosphor for about one-half hour in air at 750° C. restores said modified phosphor to an unreduced condition with an optical refractive index now measuring approximately 1.633. A like result can also be produced upon incorporating approximately 1.5 weight percent aluminum ion in said phosphor matrix.

Suitable polymers for selection or preparation to form the matrix constituent in the presently improved composite x-ray converter medium exhibit an optical refractive index closely matching that of the above modified phosphor constituent as above disclosed while also being transparent to the optical radiation being emitted by said phosphor. Accordingly, the optical refractive index of said polymer is required to reside within a general range 1.59-1.69, as measured at the wavelength of recall excitation energy, for some degree of the desired optical improvement to be realized and with optimum improvement being achieved with the aforementioned preferred barium fluorochloride phosphor at a polymer refractive index residing in the range 1.65-1.67. It is additionally required that the selected or prepared polymer exhibit thermoplastic behavior in order to prepare the presently improved composite medium by a meltmixing of the individual phosphor and the polymer constituents in a manner more fully described hereinafter. A variety of thermoplastic homopolymers and copolymers having all of the foregoing requisite characteristics are already known. For example, it has already been reported that the presence of various aromatic groups in a polymer chain can elevate the polymer refractive index as does bromide, sulfone, and ketone moieties. To still further illustrate such effect, aromatic polycarbonates formed with 4, 4' dihydroxydiphenyl-1, 1-ethane exhibit a 1.5937 refractive index whereas polymers formed with 4, 4' dihydroxytriphenyl-2, 2, 2-ethane exhibit a 1.613 refractive index. Still other known polymeric materials to be considered as having the following reported optical refractive indices include polystyrene having $N_d = 1.59-1.592$, poly (o-methoxystyrene) having $N_d = 1.5932$, poly (vinylidene chloride) having $N_d = 1.60-1.63$, poly (pentachlorophenyl methacrylate) having $N_d = 1.608$, poly (phenyl$\alpha$-bromoacrylate) having $N_d = 1.612$, poly (2,6 dichlorostyrene) having $N_d = 1.6248$, poly (sulfone) having $N_d = 1.633$, and poly ($\alpha$-naphthyl methacrylate) having $N_d = 1.6410$.

The preferred polysulfone polymers to form said matrix constituent are commercially available. Said known commercially available polymers are homopolymers such as that now being manufactured by the Union Carbide Corporation under the trade name "UDEL" as an optically transparent thermoplastic material for various end product applications. Other suitable polysulfone polymers include copolymers of polysulfone with bis-phenol moieties such as bis-phenol A as well as other bis-phenols. To further illustrate such copolymer preparation, there can be employed the copolymerization product of 4, 4' dichlorodiphenylsulfone, bis-phenol A, and another bis-phenol.

The basic digital radiographic imaging system utilizing the presently improved photostimulable x-ray image converter medium comprises:

(a) an x-ray image converter member having a layer configuration with a surface area of at least one-half square foot and comprising a composite of modified phosphor particles suspended in a matrix of a solid synthetic organic polymer having an optical refractive index closely matching the optical refractive index of said phosphor, said modified phosphor comprising crystals of a europium activated barium fluorohalide further containing a sufficient level of an impurity ion selected from Group 1A and 3A elements in the periodic table of elements to reduce the optical refractive index of said phosphor, and with said composite phosphor medium further exhibiting the optical refractive index match at the wavelength of stimulating electromagnetic radiation employed to recall a latent radiographic image previously stored by X radiation in said phosphor, (b) an x-ray source to expose said x-ray image converter member to x-rays passing through an object and record a latent radiographic image in said member, (c) a source of electromagnetic radiation to recall said radiographic latent image as an optical image thereof, (d) photodetection means optically coupled with said x-ray image converter member to read the optical image, and (e) means for digital recording of said optical image.

In the preferred embodiments, digital computer means are employed for recording the recalled optical image formed by the x-ray image converter member and which can further include electronic signal processing circuitry to enhance the quality of the finally recorded radiographic image by various already known information processing techniques. Accordingly, the electronic analog signals generated by photodetection means employed in said preferred radiographic imaging systems are transmitted to said digital image processing means in said preferred systems which can still further include a contemporaneous visual display operatively associated with the digital image processing means, such as a vidicon camera.

DETAILED DESCRIPTION OF THE PREFERRED EMBODIMENT

Figure 1:
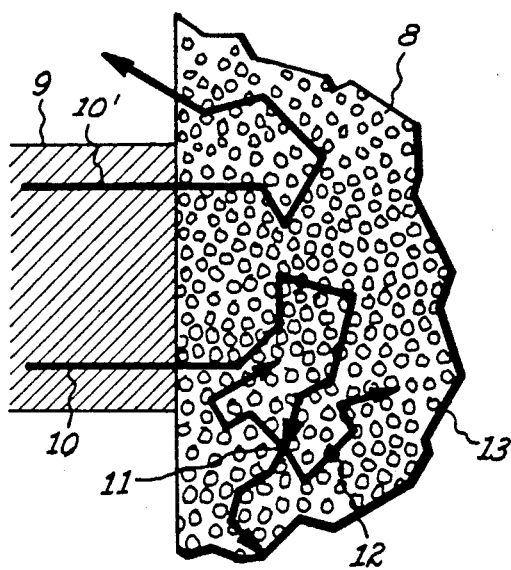
FIG. 1 is a side elevation view depicting the formation of an optical image in a prior art x-ray image converter medium.

Referring to the drawings, FIG. 1 illustrates the retrieval of an optical image from a prior art x-ray image converter member having a latent radiographic image previously stored therein. As above indicated for an accurate recall of all stored information with a moving laser beam, it is required that said photostimulation energy be primarily restricted to the lateral area being read at a particular time interval while further penetrating said entire medium at the readout location. It will be apparent from said requirements that any scattering of said input radiation beyond the width of said laser beam can effectively impair or preclude needed energy absorption by all information containing phosphor particles at the readout site. In this prior art form of porous phosphor medium 8, there is shown the light paths for a pair of representative infrared rays 10 and 10' forming a portion of the helium-neon laser beam 9 serving to recall the stored radiographic image. It can be noted from said illustration that first infrared ray 10 is caused to be scattered because of a difference in the index of refraction between the phosphor particles and any air or interstitial matter located between said phosphor particles before becoming absorbed at transition site 11. Since said transition site also resides beyond the width of a laser beam 9 there occurs an understandable loss of needed excitation energy at the readout location. Furthermore, the excessive scattering of said infrared ray in the phosphor medium before reaching said transition site 11 and which is further accompanied by scattering of the resultant lower energy optical photons 12 produced at said transition site represent other energy losses. The remaining illustrated infrared ray 10' is likewise excessively scattered in said porous phosphor medium to a greater degree whereby its tortuous light path becomes reversed with respect to the direction of said impinging laser beam and before said input photostimulation energy can reach a transition site containing additional stored information. It becomes thereby evident from such excessive scattering of the recalling energy that some resolution loss will be experienced in the present type readout procedure. It is further evident in said porous phosphor medium that only a shallow penetration by the recalling energy can be achieved with a resultant inaccurate retrieval of all stored information.

Figure 2:
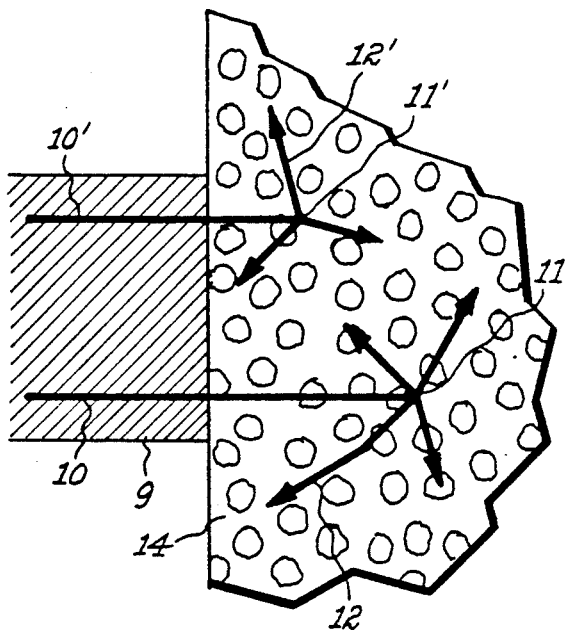
FIG. 2 is a side elevation view depicting the formation of an optical image according to the present invention.

In contrast to the disadvantages being experienced with the above prior art converter medium there is shown in FIG. 2 a side elevation view illustrating image retrieval in the index-matched converter medium 14 according to the present invention. Herein, said representative recall energy rays 10 and 10' both penetrate the void-free composite medium for absorption at transition sites 11 and 11' located within the lateral area being impinged by laser beam 9 and which reside at different levels within said lateral area. As can be noted in said illustration, the relative freedom from light scattering in the present composite medium now enables a complete readout of the latent radiographic image without experiencing loss of the recalling energy. Substantially all of said recall energy can now penetrate the entire phosphor medium at the readout site and be converted to optical photons 12 at substantially all transition sites. Here the resultant emerging light paths 12 and 12', respectively, can also be noted as relatively free of scattering and thereby les prone to causing defects in the recovered optical image. The additional presence of a transparent matrix material 14 in the present composite medium having an optical refractive index closely matched to the phosphor particles understandably contributes to said improved freedom from all light scattering in said conversion medium. Of greater significance to the superior performance being exhibited by the present composite phosphor medium, however, is the previously disclosed requirement for said index-match to occur at the wavelength of the photostimulation energy source being employed to recall the latent radiographic image stored in said medium. As a direct consequence of such index-matching characteristic in the present composite medium, said energy excitation rays now become absorbed rather than scattered at transition sites throughout the entire phosphor depth and with the converted optical radiation also being emitted more efficiently from said medium than occurs from the prior art phosphor medium hereinbefore employed in the present type digital radiographic imaging system.

To prepare a suitable composite x-ray image converter medium according to the present invention first requires proper dispersion of the selected phosphor particles in a matrix of the selected thermoplastic polymer. In doing so, with the preferred polysulfone polymer it is required that phosphor particles be properly dispersed in the molten thermoplastic which can be achieved with a suitable mixture of the individual solid constituents by various conventional means. Specifically, said preferred polymer preparation method comprises forming a solid physical mixture of said polysulfone polymer with particles of the preferred europium activated barium fluorochloride phosphor, subjecting said mixture to sufficiently elevated temperature and pressure conditions whereby said polymer is melted and a substantially void-free suspension of said phosphor particles therein formed, and cooling said molten phosphor suspension to ambient conditions whereby the solid converter member is formed. In one such method of preparation, approximately 33 parts by weight of said preferred polysulfone resin were dry blended with approximately 66 parts by weight of the preferred fluorochloride phosphor and said dry blend thereafter melt mixed in a Brabender ¾" single screw extruder at approximately 540° F. The resulting extrudate was quenched in a water bath and pelletized. Said dry pellet mixture was thereafter compression molded by conventional means to form a final self-supporting layer with the desired area dimensions and at thickness of approximately 40 mils. For the compression molding of said final member when employing the above identified polysulfone homopolymer, molding temperatures in the approximate range 540° F. to 750° F. can be used whereas the applied pressures can be in the approximate range 700 to 2000 pounds per square inch. An alternative method of preparation can employ injection molding at the above indicated elevated temperature and pressure conditions of the solid physical mixture. Such employment of conventional injection molding technique permit the melt-mixing of the composite medium and forming the final layer configuration for said x-ray image converter member to be carried out in a single operation. A still further method of preparation for said composite member comprises dissolving the solid polysulfone polymer in an organic liquid solvent, thereafter dispersing particles of the selected phosphor in said solution, and subsequently removing the organic liquid solvent to form the solid powder mixture having said phosphor particles coated with said polymer. Final preparation of a self-supporting x-ray image converter member with said solid mixture can follow the preparation steps already above specified. It is further contemplated in utilizing such molding of the final composite member to sequentially apply various heating and pressure conditions to the mold.

Figure 3:
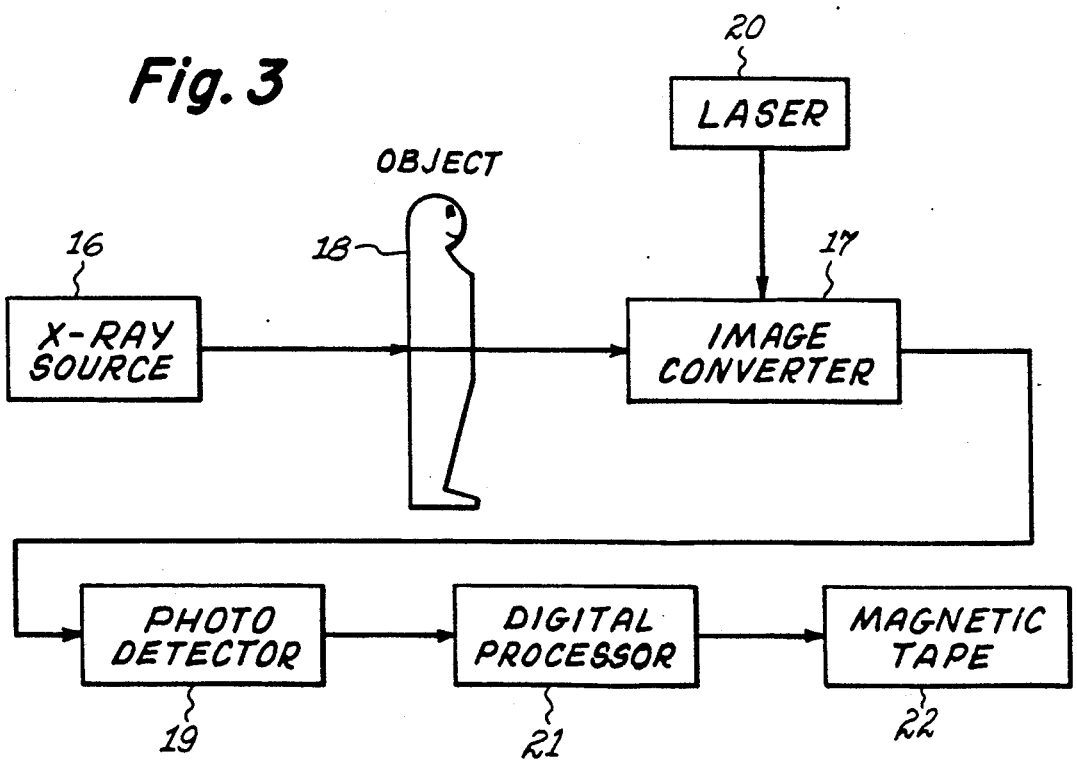
FIG. 3 is a schematic representation for a typical digital radiographic imaging system according to the present invention.

FIG. 3 depicts schematically a representative digital radiographic imaging system according to the present invention. Specifically, there is depicted in block diagram form a conventional x-ray source such as an x-ray tube 16 to first expose the present x-ray image converter member 17 to x-rays passing through an object 18 for recording a latent radiographic image in said medium. Photodetection means 19 which may comprise a conventional photomultiplier tube, photodiodes, or charge transfer devices including charge coupled devices and charge injection devices are optically coupled with said x-ray image converter member 17 to subsequently read the optical image upon photostimulation of the latent radiographic image stored in said medium. Such retrieval of the latent radiographic image is achieved by scanning said x-ray image converter member 17 with laser means 20 which projects a scanning beam across the surface of said phosphor medium. The output signals from said photodetection means 19 provide an electronic reproduction of said retrieved optical image for further processing with high speed electronic computer means 21 incorporating an image processing algorithm developed for said purpose. As previously indicated, said digital processing means 21 in the present radiographic system can also include additional signal processing means to further enhance the quality of said converted optical image. Said digitized optical image is finally recorded by known electronic recording means 22 such as magnetic tape and which as further previously indicated can be further contemporaneously viewed as a reconverted visual image by other known electronic display means operatively associated with said recording means.

The present method of recording a digital radiographic image thereby comprises exposing a photostimulable x-ray image converter member according to the present invention to an x-ray source after passage through an object to record a latent radiographic image in said member, stimulating said x-ray image converter member with an energy source of electromagnetic radiation in an imagewise pattern to recall said latent radiographic image as an optical image thereof, and directly recording said optical image by digital processing means. In accordance with said method, the latent radiographic image stored in the composite phosphor medium is converted to an electronic image by the operatively associated digital computer means for processing and storage to produce an enhanced digitized image having improved visual characteristics. For the purpose of better achieving said latter objective it becomes desirable to capture all of the phosphor emission emerging from the present x-ray image converter medium. To do so can advise a co-operative physical relationship between the scanning photodetection means employed in the present radiographic imaging system and the x-ray image converter component whereby all or most of said emerging radiation will be detected.

It will be apparent from the foregoing description that a broadly useful improved photostimulable x-ray image converter medium has been discovered for digital radiography enabling superior information retrieval. It will be apparent from said foregoing description, however, that various modifications in the specific embodiments above described can be made without departing from the spirit and scope of the present invention. For example, certain minor modifications in the composition of the present phosphor and polymer materials being employed is possible without experiencing a total loss of the improved optical response. Additionally, still other physical configurations of the presently improved digital radiographic imaging system than above specifically disclosed are possible to make still better use of the disclosed composite x-ray image converter medium. It is intended to limit the present invention, therefore, only by the scope of the following claims:

What we claim as new and desire to secure by Letters Patent of the United States is:

1. A method to form an improved photostimulable storage member for digital radiography enabling recall of a latent radiographic image previously stored by X radiation with a moving beam of stimulating electromagnetic radiation selected from the class of ultraviolet, visible and infrared radiation so that minimal scattering of the moving beam occurs in the storage member beyond the width of the moving beam which comprises:
   (a) forming a first solid physical mixture with crystals of a europium activated barium fluorohalide phosphor and a sufficient amount of a chemical compound containing an impurity ion selected from Group 1A and 3A elements in the periodic table of elements for incorporation of 0.3-3.0 weight percent impurity ion based on the weight of phosphor into said phosphor in order to reduce the optical refractive index of said phosphor,
   (b) heating said first solid physical mixture causing the impurity ion to selectively diffuse into the phosphor matrix.
   (c) forming a second solid physical mixture by combining the treated phosphor crystals with a thermoplastic synthetic organic polymer having an optical refractive index range extending from approximately 1.59 up to approximately 1.69 at the wavelength of stimulating electromagnetic radiation being employed.
   (d) subjecting said second solid physical mixture to sufficiently elevated temperature and pressure conditions whereby said polymer is melted and a substantially void-free suspension of said phosphor crystals is formed, and
   (e) cooling said molten phosphor suspension to ambient conditions whereby a solid storage member is formed, the storage member being further characterized by having a self-supporting layer configuration with a layer thickness sufficient to absorb 60-70% of the X radiation employed to form a latent radiograpic image therein.

2. A method as in claim 1 wherein said first solid physical mixture is formed by contacting the phosphor crystals with a liquid solution of said impurity ion compound and the solvent in said solution thereafter removed to provide a solid admixture.

3. A method as in claim 1 wherein the heating of said first solid physical mixture is carried out under non-oxidizing conditions and followed by reheating under oxidizing conditions.

4. A method as in claim 1 wherein the solid storage member is formed in a mold with said second solid physical mixture.

5. A method to form an improved photostimulable storage member for digital radiography enabling recall of a latent radiographic image previously stored by X radiation with a moving beam of stimulating electromagnetic radiation selected from the class of ultraviolet, visible and infrared radiation so that minimal scattering of the moving beam occurs in the storage member beyond the width of the moving beam which comprises:

(a) forming a first solid physical mixture with crystals of a europium activated barium fluorochloride phosphor and a sufficient amount of a chemical compound containing an impurity ion selected from Group 1A and 3A elements in the periodic table of elements for incorporation of 0.3–3.0 weight percent impurity ion based on the weight of phosphor into said phosphor in order to reduce the optical refractive index of said phosphor, (b) heating of said first solid physical mixture causing the impurity ion to selectively diffuse into the phosphor matrix, (c) dissolving a solid thermoplastic synthetic organic polymer having an optical refractive index range extending from approximately 1.59 up to approximately 1.69 at the wavelength of stimulating electromagnetic radiation being employed in an organic liquid solvent, (d) dispersing crystals of the treated phosphor in said solution, (e) removing said organic liquid solvent to form a second solid physical mixture having said treated phosphor crystals coated with said polymer, (f) heating said second solid physical mixture at sufficiently elevated temperature and pressure conditions in a mold whereby said polymer coating is melted and a substantially void-free suspension of said phosphor crystals therein is formed, and (g) cooling said mold to ambient conditions whereby a solid storage member having said mold configuration is formed, the storage member being further characterized by having a self-supporting layer configuration with a layer thickness sufficient to absorb 60–70% of the X radiation employed to form a latent radiographic image therein.

6. A method as in claim 5 wherein the heating and pressure conditions are sequentially applied to the mold containing the second solid physical mixture.

7. A method as in claim 6 wherein the second solid physical mixture is placed in a preheated mold, pressure applied to said mixture filled mold with heating, and additional pressure applied to said mold with cooling to form the final solid storage member.

8. A method as in claim 5 wherein the elevated temperatures are in the approximate range 540° F. to 750° F. whereas the applied pressures are in the approximate range 700 to 2000 pounds per square inch.

* * * * *